No. 892,199. PATENTED JUNE 30, 1908.
W. R. WEBSTER.
STARTING MEANS FOR EXPLOSIVE ENGINES.
APPLICATION FILED NOV. 3, 1906. RENEWED DEC. 14, 1907.
2 SHEETS—SHEET 1.
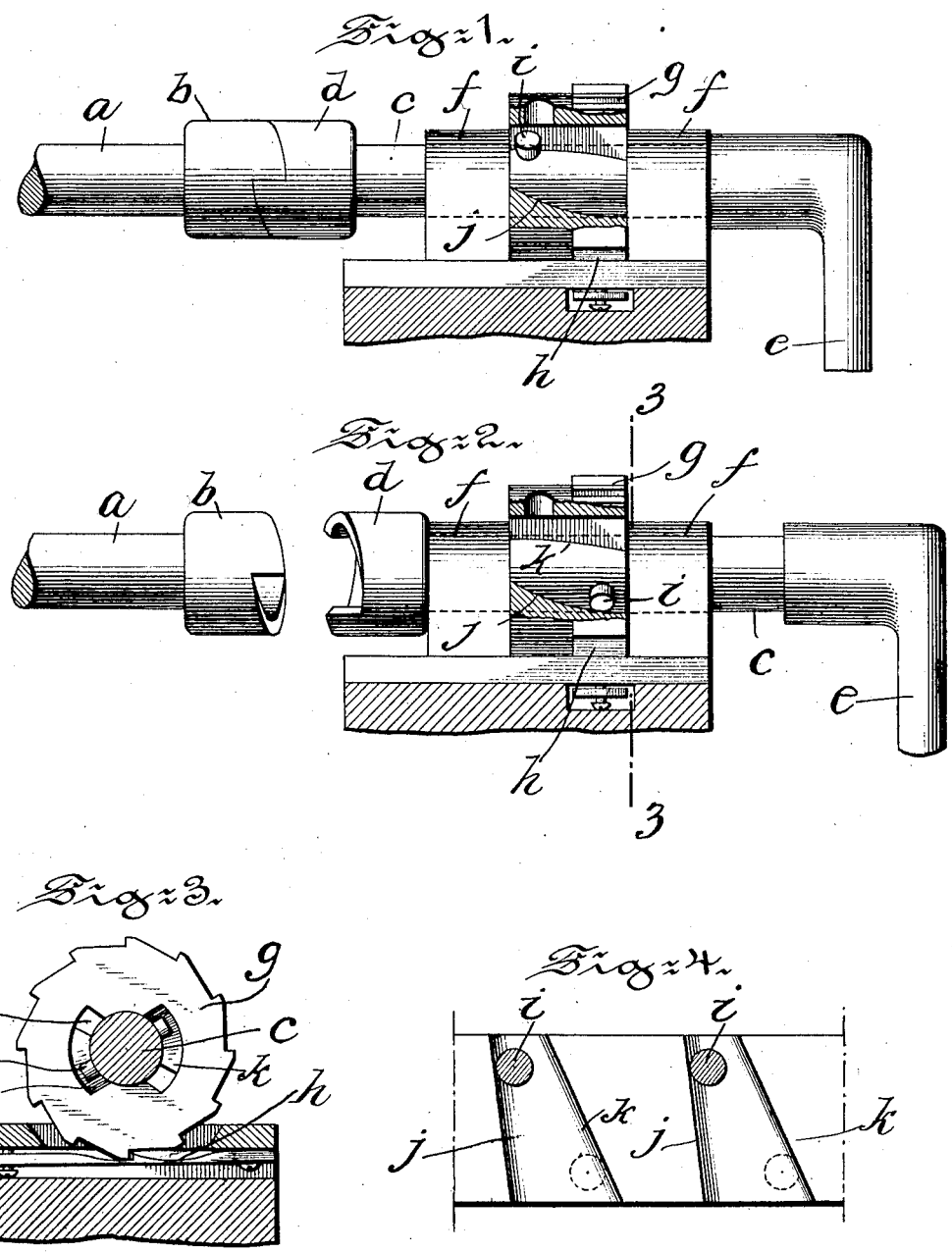

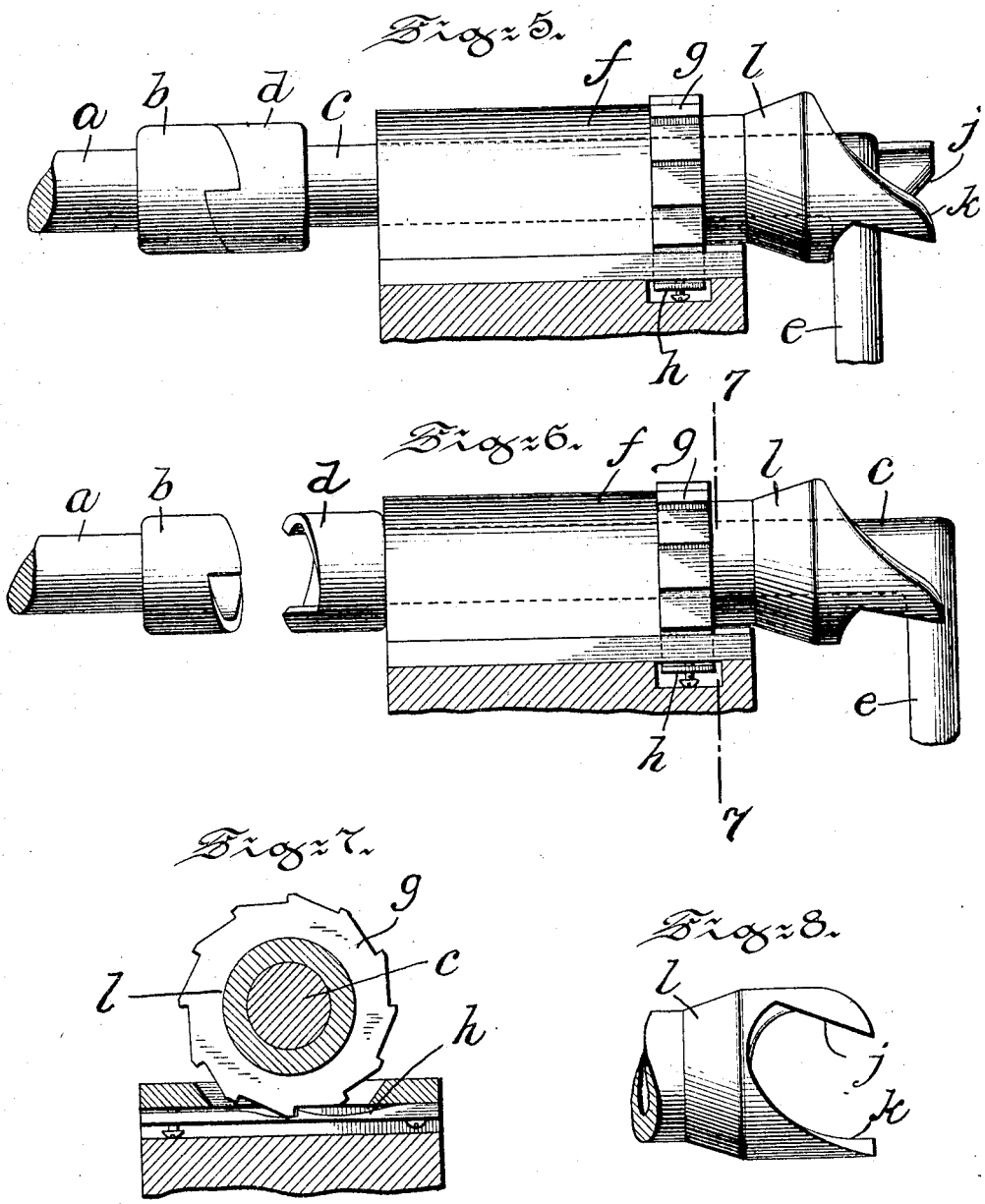

UNITED STATES PATENT OFFICE.

WILLIAM R. WEBSTER, OF PHILADELPHIA, PENNSYLVANIA.

STARTING MEANS FOR EXPLOSIVE-ENGINES.

No. 892,199. Specification of Letters Patent. Patented June 30, 1908.

Application filed November 3, 1906, Serial No. 341,872. Renewed December 14, 1907. Serial No. 406,487.

*To all whom it may concern:*

Be it known that I, WILLIAM R. WEBSTER, a citizen of the United States, and a resident of the city and county of Philadelphia, State of Pennsylvania, have invented certain new and useful Improvements in Starting Means for Explosive-Engines, of which the following is a specification.

My invention relates to improvements in starting devices for explosive engines, and the object of my invention is to furnish a means for preventing injury to the operator in the event of a "back kick", caused by a premature explosion of the charge in the cylinder of the engine, which results in a sudden reversal of the starting crank.

In a pending application for Letters Patent of the United States, Serial No. 340,261, filed October 24, 1906, I have shown and described a safety starting device for explosive engines in which the shaft of the starting crank carries a gear wheel the teeth of which form parts of screw threads which engage a detent. Upon a forward movement of the starting crank in this device the screw thread like teeth of the gear wheel pass over and depress the detent and the clutches on the crank and engine shafts engage, the former driving the latter. A reverse movement of the engine shaft causes a reverse movement of the crank shaft until one of the teeth of the gear carried by this latter shaft, engages the detent which acting upon the screw like tooth causes the gear wheel and the crank shaft carrying it to be moved laterally away from the engine shaft until the clutches carried by these shafts are unlocked when movement of the crank ceases.

I accomplish the above results in my present invention but instead of the gear wheel having inclined teeth and being fast to the crank shaft, I employ ratchet wheel loose on the crank shaft and I permit the crank shaft to move laterally of the ratchet wheel which has no lateral movement. Through suitable mechanism I drive the ratchet wheel in one direction by the movement of the crank shaft and through the gear wheel and suitable connections I cause the crank shaft, upon a reverse movement of the engine shaft, to move laterally until the clutches locking these shafts together are disengaged.

In the accompanying drawings forming part of this specification and in which similar letters of reference indicate similar parts; Figure 1, is a side elevation, partly in section, of my improved explosive engine starting means; the clutches upon the engine and crank shafts being in engagement; Fig. 2, a similar view the clutches being disengaged; Fig. 3, a section of Fig. 2 on line 3—3; Fig. 4, a development of the inner part of the ratchet wheel in Figs. 1 and 2; Fig. 5, a side elevation of a modification of my engine starting means, the clutches on the engine and starting crank shafts being in engagement; Fig. 6, a similar view, the clutches being disengaged; Fig. 7, a section of Fig. 6 on line 7—7; Fig. 8, a top view of the forked end of hub of ratchet wheel, Figs. 5 and 6.

$a$ is part of the shaft of an explosive engine, $b$ the clutch carried by this shaft, $c$ the starting crank shaft, $d$ the clutch carried by this shaft, $e$ part of the starting crank, $f$ the bearing carrying the starting crank and shaft. All of these parts are usual and well known.

Referring now to Figs. 1, 2, 3, 4, $g$ is a ratchet wheel surrounding the shaft $c$ and prevented from lateral movement by the sides of the bearing $f$. $h$ is a pawl or detent permitting the rotation of the ratchet wheel in one direction but not in the other. $i$ is a pin passing through shaft $c$, or teeth or lugs carried by opposite sides of the shaft, the ends of which are adapted to engage inclined faces $j$—$k$ formed inside of the ratchet wheel $g$. Upon a movement of the starting crank and shaft to turn over the engine shaft $a$, the pin, teeth, or lugs $i$, engage the faces $j$, and move in along these faces until the clutches $b$—$d$ are in engagement and a further movement of the starting crank turns over the engine and causes the ratchet wheel $g$ to rotate. If now a "back kick" should occur the movement of the shafts would be reversed and the pins $i$ would act to reverse the motion of ratchet wheel $g$, but this movement of the ratchet is prevented by the pawl $h$, the consequence is that the pins $i$ will have to travel along the sides of the inclined faces $k$, as indicated by dotted lines in Fig. 4; they will thus cause shaft $c$ to move rotarily and laterally until the latter movement is so great as to unlock the clutches $b$—$d$.

In Figs. 5—6—7 and 8, a modification of this device is shown,—a hub $l$, fast to ratchet wheel $g$, carries a forked end, the sides of the forks being inclined as are the faces $j$—$k$ already described, and the crank handle $e$ taking the place of the pin $i$. The operation of this device is precisely similar to that already described and further description will be unnecessary.

It will be observed that upon a reverse movement of the starting crank handle and shaft the pin $i$, or the part that takes the place of this pin, is in engagement with the inclined face $k$ formed in the ratchet wheel or on a hub carried by this wheel. This arrangement prevents a quick and free reverse movement of the crank while serving to move the crank shaft clutch out of engagement with the engine shaft clutch.

Having thus described my invention I claim as new and desire to secure by Letters Patent:

1. In a starting mechanism of the class described, in combination, an engine shaft, a starting crank shaft and crank, a clutch one member of which is carried by the engine shaft and the other by the crank shaft, a ratchet wheel surrounding but not attached to said crank shaft, a pawl adapted to prevent the rotation of ratchet wheel in one direction, and a connection between said crank shaft and ratchet wheel by means of which a rotation of said crank shaft in one direction will cause a rotation of said ratchet wheel and advance the clutch on said crank shaft into engagement with the clutch on said engine shaft, and a rotation of said engine shaft in the opposite direction will cause a longitudinal movement of said crank shaft through said ratchet wheel and away from said engine shaft.

2. In a starting mechanism of the class described, in combination, an engine shaft, a starting crank shaft, a clutch one member of which is carried by the engine shaft and the other by the crank shaft, a pin or projection carried by said starting crank shaft, a ratchet wheel loose on said crank shaft, and furnished with inclined faces adapted to be engaged by said pin or projection, and a pawl for preventing a reverse movement of said ratchet wheel.

3. In a starting mechanism of the class described, in combination, an engine shaft, a starting crank shaft, a clutch one member of which is carried by the engine shaft and the other by the starting crank shaft, a ratchet wheel surrounding and loose on the starting crank shaft and furnished interiorly with inclined faces adapted to be engaged by a pin carried by the starting crank shaft, said pin, and a pawl for preventing a backward movement of said ratchet wheel.

WM. R. WEBSTER.

Witnesses:
GEORGE W. SELTZER,
CHARLES A. RUTTER.